US007796883B2

(12) United States Patent
Darbha et al.

(10) Patent No.: US 7,796,883 B2
(45) Date of Patent: Sep. 14, 2010

(54) FLEXIBLE CIRCUIT CONNECTION

(75) Inventors: Krishna Darbha, Seattle, WA (US);
Paul Hornikx, Issaquah, WA (US);
Juscelino Okura, Redmond, WA (US);
Jagtar Singh Saroya, Washougal, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 11/784,682

(22) Filed: Apr. 9, 2007

(65) Prior Publication Data

US 2008/0247747 A1     Oct. 9, 2008

(51) Int. Cl.
*G03B 17/04*     (2006.01)
(52) U.S. Cl. ...................... 396/542; 396/348
(58) Field of Classification Search ................. 396/428, 396/542, 532
See application file for complete search history.

(56) References Cited

U.S. PATENT DOCUMENTS

| | | | | |
|---|---|---|---|---|
| 4,214,466 A * | 7/1980 | Lassche | ...................... | 72/142 |
| 5,181,065 A | 1/1993 | Hara | .......................... | 354/485 |
| 5,371,569 A | 12/1994 | Tanaka | ....................... | 354/485 |
| 5,758,208 A * | 5/1998 | Fujii et al. | .................... | 396/87 |
| 5,950,019 A * | 9/1999 | Azegami et al. | .............. | 396/72 |
| 6,002,437 A | 12/1999 | Morioka et al. | ............. | 348/373 |
| 6,074,218 A * | 6/2000 | Wu et al. | ....................... | 439/63 |
| 6,112,034 A | 8/2000 | Takao et al. | ................. | 396/542 |
| 6,160,967 A | 12/2000 | Mizobuchi | ................. | 396/542 |
| 6,218,074 B1 | 4/2001 | Dueber et al. | ............ | 430/273.1 |
| 6,287,021 B1 * | 9/2001 | Katoh et al. | ................. | 396/348 |
| 6,493,511 B2 | 12/2002 | Sato | ............................ | 396/72 |
| 7,338,332 B2 * | 3/2008 | Simonsson et al. | .......... | 439/729 |
| 2001/0033747 A1 * | 10/2001 | Enderby | ..................... | 396/322 |
| 2006/0025023 A1 | 2/2006 | Ikeda | .......................... | 439/835 |
| 2006/0033832 A1 * | 2/2006 | Shin | ........................... | 348/335 |
| 2006/0103756 A1 * | 5/2006 | Shiozaki | ..................... | 348/360 |
| 2006/0219862 A1 | 10/2006 | Ho et al. | .................. | 250/208.1 |
| 2006/0268157 A1 | 11/2006 | Chang | ....................... | 348/373 |

(Continued)

FOREIGN PATENT DOCUMENTS

JP     05174508 A  *  7/1993

OTHER PUBLICATIONS

Wikipedia "Coil Spring", Sep. 13, 2006, http://web.archive.org/web/20060913000000/http://en.wikipedia.org/wiki/Coil_spring.*

(Continued)

*Primary Examiner*—W. B. Perkey
*Assistant Examiner*—Dennis Hancock
(74) *Attorney, Agent, or Firm*—Westman, Champlin & Kelly, P.A.

(57)     ABSTRACT

An apparatus, with moving parts, having a flexible circuit configured such that its fatigue life is enhanced. The apparatus includes a first component, a second component, and a positioning mechanism between the first component and the second component. The positioning mechanism enables movement of the first component and the second component between at least a proximate position and a spaced-apart position. Also included between the first component and the second component is a flexible circuit that has a first end coupled to the first component and a second end coupled to the second component. The flexible circuit is configured as a compliant spring that can extend and collapse in a predefined shape when the components are spaced-apart and proximate, respectively.

13 Claims, 7 Drawing Sheets

U.S. PATENT DOCUMENTS

2007/0014569 A1   1/2007   Yu ............................ 396/542
2008/0099636 A1*  5/2008   Depay et al. ............... 248/74.2

OTHER PUBLICATIONS

"Flexible Printed Circuit," http://72.14.235.104/search?q=cache;bwN19E7eKv8J:www.electronics-manufactureres.com/info/circuits-and-procesors/flexible-printed-circuit-fpc.html+Flexible+Printed+Circuit+Connection&hl=en&ct=clnk&cd=2&gl=in, prior Apr. 2007, pp. 1-6.

"Flexible Printed Circuit Board for Camera," http://netronfpc..en.alibaba.com/product/50182658/51035418/Flexibie_Printed_Circuit_Boards/Flexible_Printed_Circuit_Board_for_Camera/showimg.html, Netron Soft-Tech Co., Ltd., 2006, pp. 1-3.

"Double Sided FPC," Xiamen Guangpu Electronics Co., Ltd., http://gpelec.en.alibaba.com/product/50200897/51115450/FPC/Double_Sided_FPC/showing.html, Alibaba.com Corporation, 1999, pp. 1-4.

* cited by examiner

FLEXIBLE CIRCUIT CONNECTION

BACKGROUND

In many photographic devices, in order to protect a photographic lens of the device, a lens barrel that can be retracted into the main body of the device is employed. In certain photographic devices, such as webcams, the main body includes a printed circuit board that is connected to circuitry in the lens barrel via a flexible circuit. In such devices, movement of the lens barrel into, and out of, the main body results in corresponding movement of the flexible circuit. Such movement, when repeated over time, can cause cracks to develop in the flexible circuit, thereby causing failure of the camera. This can occur in any device that has a first component and a second component, which are electrically connected to each other by a flexible circuit and moveable between a proximate position and a spaced-apart position. As device form factors are reduced, the fatigue life of the flexible circuit is further jeopardized.

The discussion above is merely provided for general background information and is not intended to be used as an aid in determining the scope of the claimed subject matter.

SUMMARY

An apparatus, with moving parts, having a flexible circuit configured such that its fatigue life is enhanced, is provided. The apparatus includes a first component, a second component, and a positioning mechanism between the first component and the second component. The positioning mechanism enables movement of the first component and the second component between at least a proximate position and a spaced-apart position. Also included between the first component and the second component is a flexible circuit (a printed circuit on a substrate) that has a first end coupled to the first component and a second end coupled to the second component. The flexible circuit is configured as a compliant spring that can extend and collapse in a predefined shape when the components are spaced-apart and proximate, respectively.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
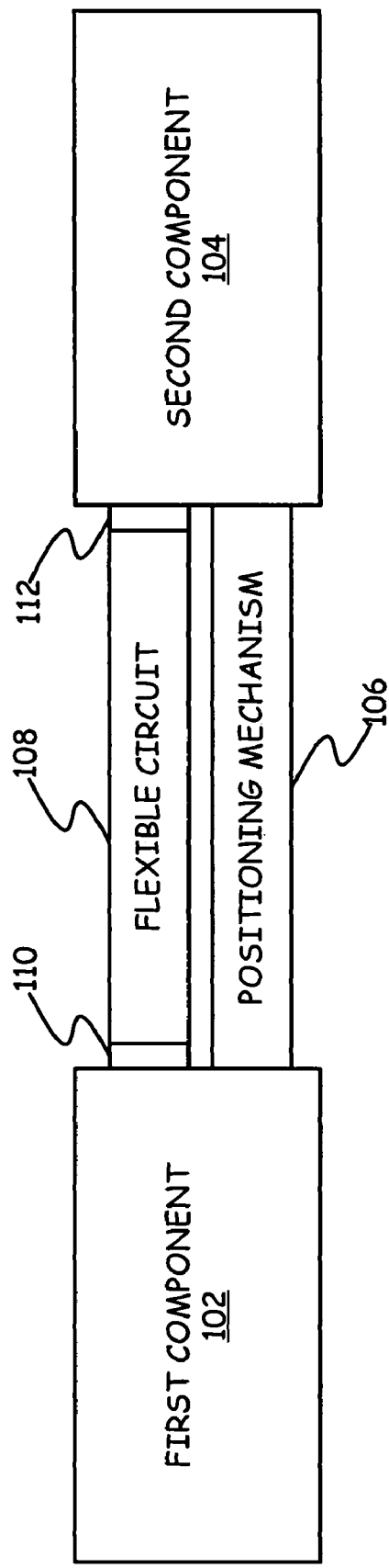
FIG. 1 is a very simplified block diagram of an apparatus that includes a flexible circuit that is configured as a compliant spring that extends and collapses in a predefined shape.

FIG. 1 is a very simplified block diagram of an apparatus 100 that includes a flexible circuit (a printed circuit on a substrate), which is configured in accordance with the present embodiments. As can be seen in FIG. 1, apparatus 100 includes a first component 102, a second component 104 and a positioning mechanism 106, between first component 102 and second component 104, that enables movement of first component 102 and second component 104 between at least a proximate position and a spaced-apart position. Also included between first component 102 and second component 104 is a flexible circuit 108 that has a first end 110 coupled to first component 102 and a second end 112 coupled to second component 104. In accordance with the present embodiments, flexible circuit 108 is configured as a compliant spring that can extend and collapse in a predefined shape when components 102 and 104 are spaced apart and proximate, respectively. As will be discussed in detail further below, configuring flexible circuit 108 such that it extends and collapses in a predefined shape avoids sharp bending of circuit 108 and minimizes stress application on the circuit. In different embodiments, flexible circuit 108 is configured in different shapes (a sinusoidal geometry, a helical spring, etc.).

Figure 2A:
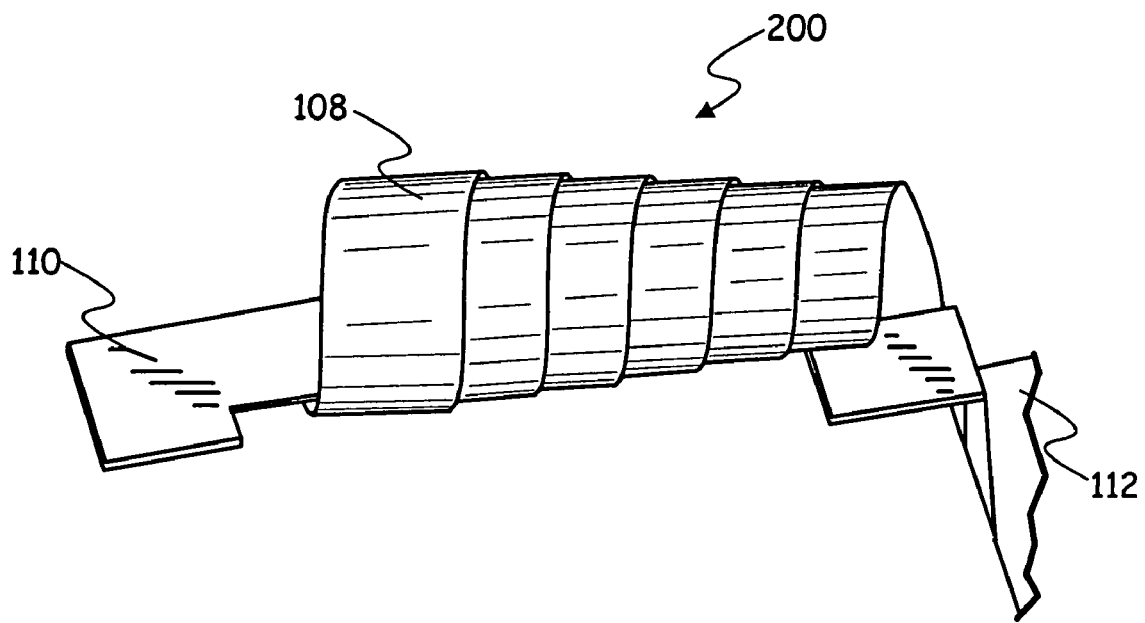
FIGS. 2A and 2B are diagrammatic illustrations of a flexible circuit configured as a helical spring.
Figure 2B:
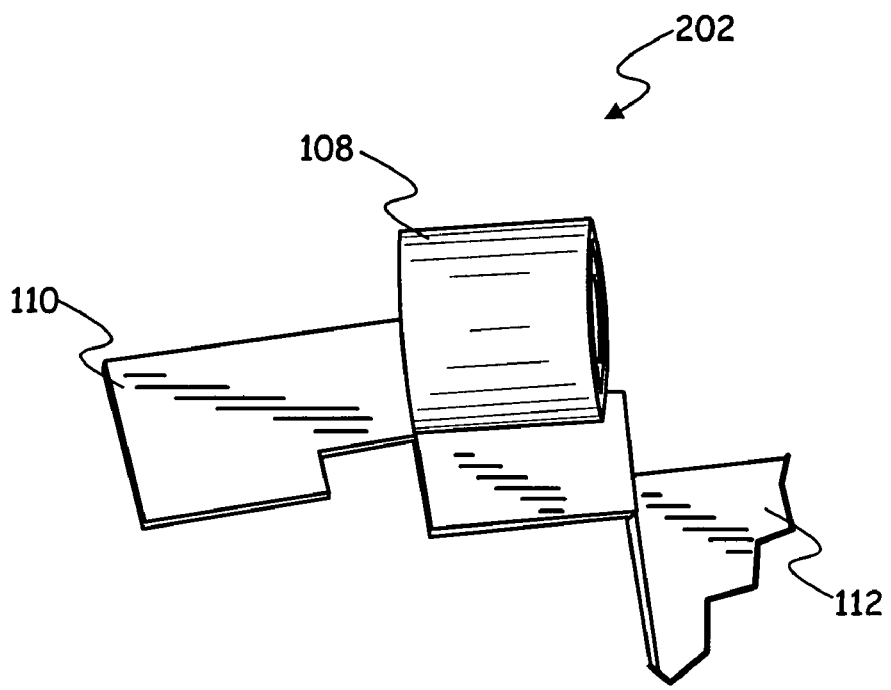

In FIGS. 2A and 2B, which in the interest of simplification do not show components 102 and 104 and positioning mechanism 106, flexible circuit 108 is configured as a helical spring. FIG. 2A shows the helical spring is a stretched condition, which would occur when components 102 and 104 are spaced apart. The stretched helical spring is denoted be reference numeral 200 in FIG. 2A. In FIG. 2B, helical spring is in a compressed condition, which would occur when components 102 and 104 are proximate to each other. The compressed helical spring is denoted be reference numeral 202 in FIG. 2B. In general, the helical spring design allows flexible circuit 108 to move in a linear fashion, and coils of the helical spring collapse into each other when components 102 and 104 are proximate to one another. This can alleviate a space constraint when components 102 and 104 are proximate to each other and also results in minimal stress application, thus enhancing the fatigue life of flexible circuit 108.

Figure 3A:
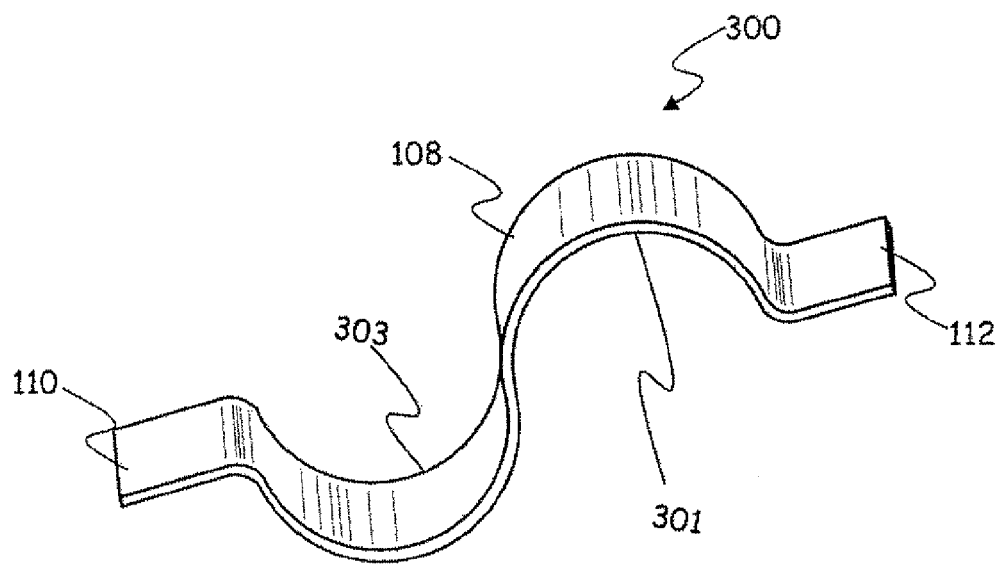
FIGS. 3A and 3B are diagrammatic illustrations of a sinusoidal flexible circuit.
Figure 3B:
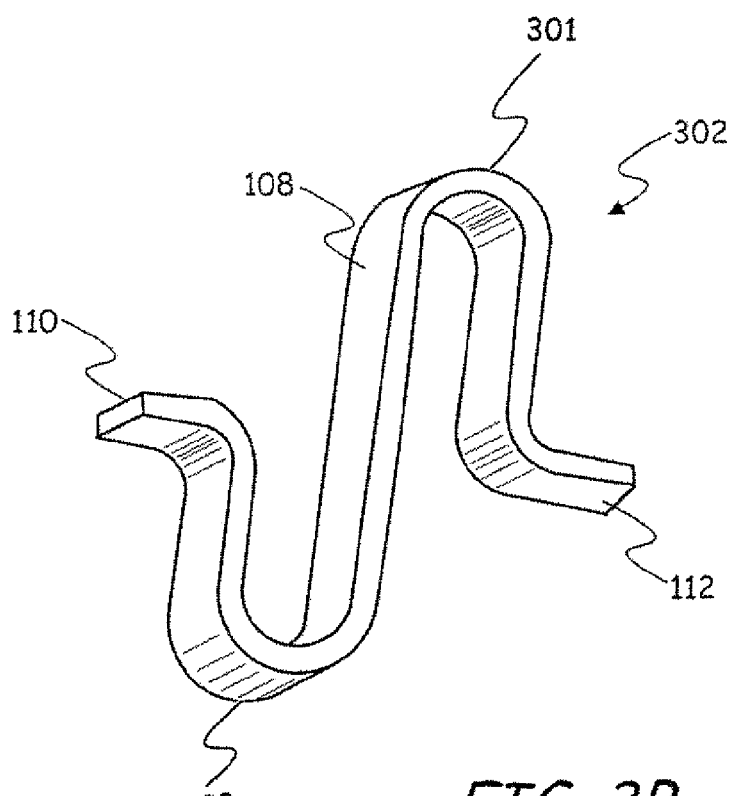

Instead of configuring flexible circuit 108 in the form of a helical spring, in can be "pre bent" (bent before it is attached to components 102 and 104) in a sinusoidal shape, for example. FIG. 3A shows flexible circuit 108, pre bent in a sinusoidal shape and in a stretched condition, which would occur when components 102 and 104 are spaced apart. The stretched sinusoidal flex circuit is denoted by reference numeral 300 in FIG. 3A. In FIG. 3B, the sinusoidal flex circuit is in a compressed condition, which would occur when components 102 and 104 are proximate to each other. The compressed sinusoidal flex circuit is denoted be reference numeral 302 in FIG. 3B. The sinusoidal design allows flexible circuit 108 to collapse in two positions or directions. This alleviates a space constraint when components 102 and 104 are proximate to each other and avoids sharp bending in portions of circuit 108, consequently minimizing stress application to the circuit. The sinusoids in FIGS. 3A and 3B include a crest 301 and a trough 303. Crest 301 and trough 303 are also included in FIG. 5, which is described further below.

Instead of employing a pre bent sinusoidal shape for flexible circuit 108, the sinusoidal shape (or any other suitable shape) can be enforced by utilizing suitably positioned posts, or other guiding mechanisms, that influence a shape in which flexible circuit 108 bends when components 102 and 104 are spaced apart and proximate. Embodiments that utilize posts to enforce a particular shape of a flexible circuit (such as 108) are described further below in connection with FIG. 5.

In general, the above-described configurations of a flexible circuit can be utilized in a photographic device that has a lens barrel that can be retracted into the main body of the device. In such devices, the flexible circuit is connected between the main body and the lens barrel and moves when the lens barrel is moved into, or out of, the main body.

Figure 4A:
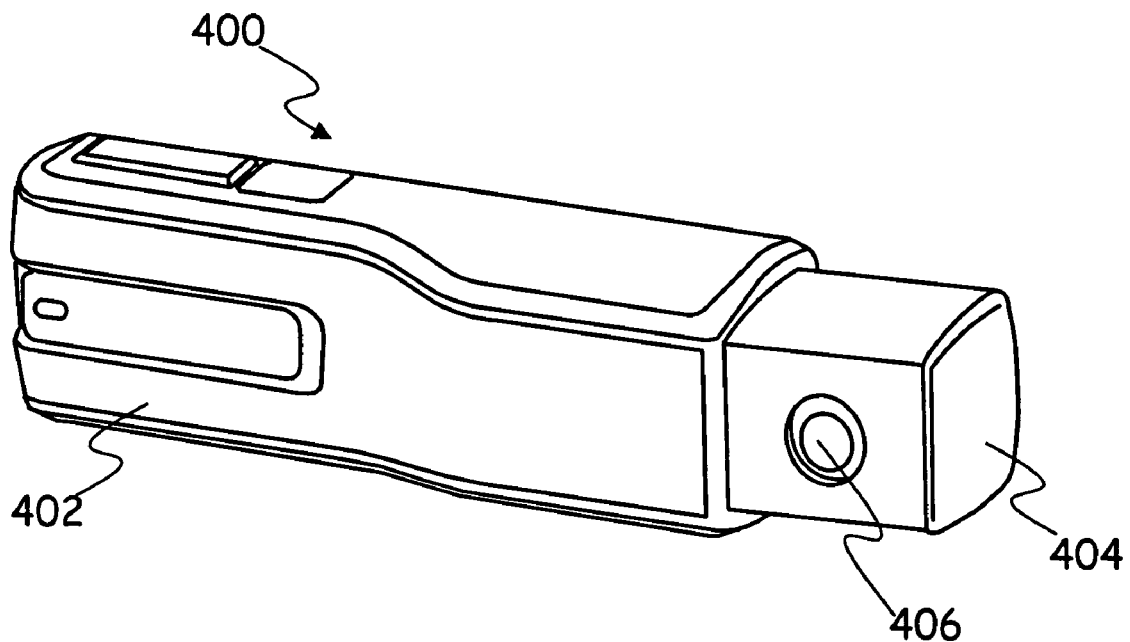
FIGS. 4A and 4B are diagrammatic illustrations of a photographic device in which the present embodiments are useful.
Figure 4B:
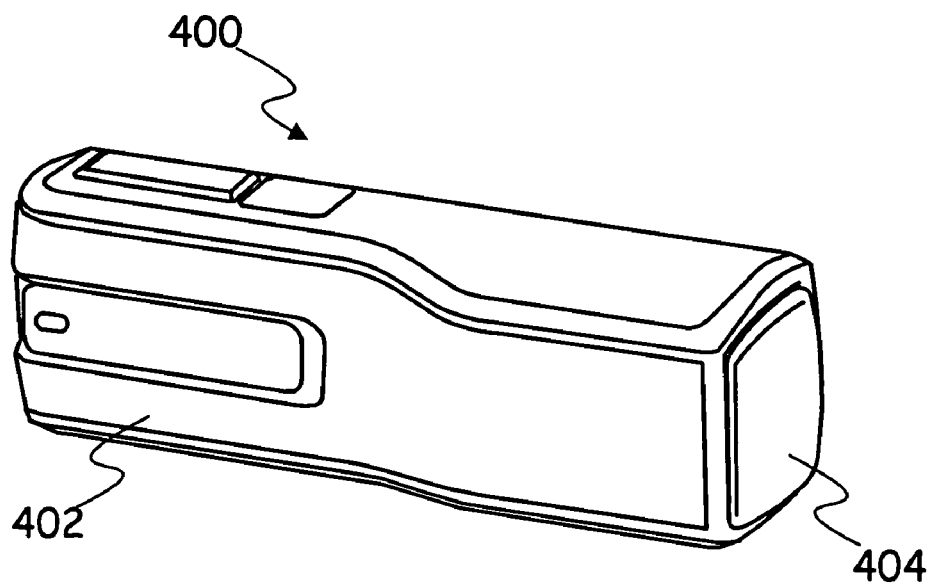
Figure 5:
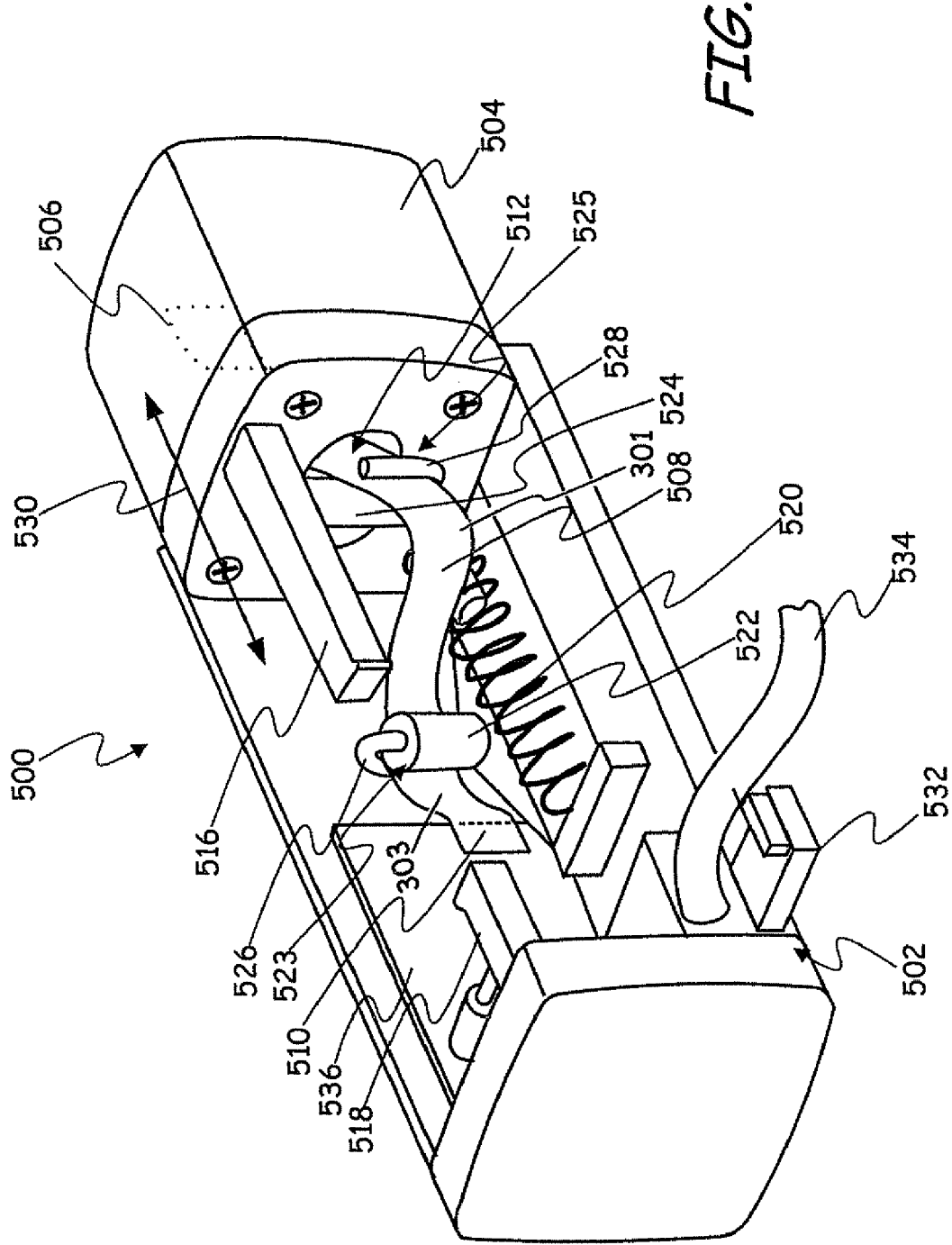
FIGS. 5 and 6 are diagrammatic illustrations of specific embodiments of webcams, with retractable lens barrels, having flexible circuits configured in accordance with the present embodiments.
Figure 6:
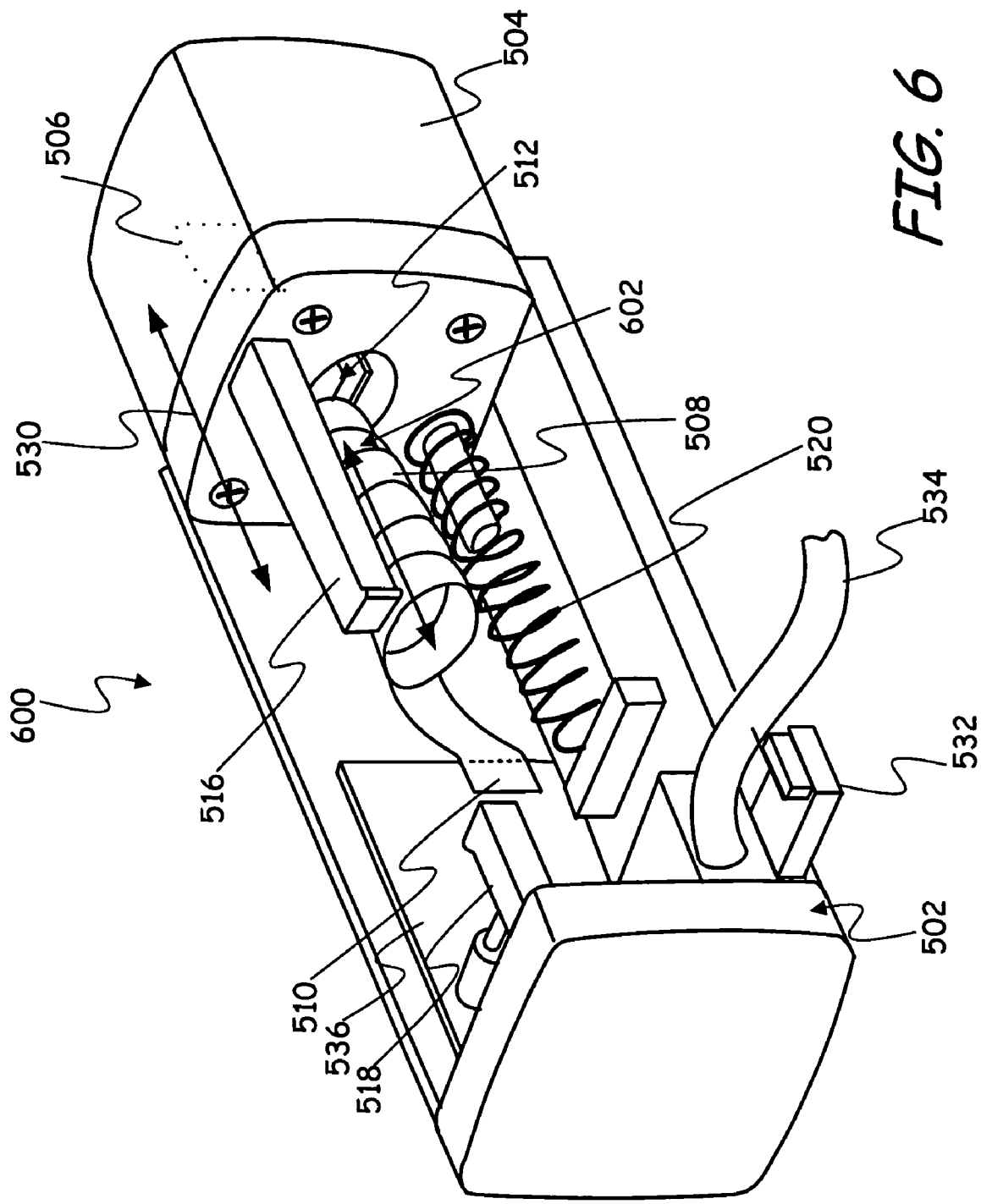

FIGS. 4A and 4B are simplified block diagrams of a photographic device 400 in which the present embodiments are useful. Photographic device 400 includes a main body 402 (which is a specific example of first component 102 of FIG. 1) and a lens barrel 404 (which is a specific example of second component 104 of FIG. 1) that has a photographic lens 406. As can be seen in FIG. 4A, lens barrel 404 is positioned such that it extends substantially outside main body 402. In this position, photographic device 400 is capable of taking pictures. Lens barrel 404 is moveable between the extended position (a specific example of the spaced-apart position discussed in connection with FIG. 1), shown in FIG. 4A, and a retracted position (a specific example of the proximate position discussed in connection with FIG. 1) shown in FIG. 4B, in which lens barrel 404 is within main body 402. In the retracted position, photographic lens 406 is protected from being soiled or damaged by hitting other objects. It should be noted that photographic device 100 may be a webcam (video camera, usually attached directly to a computer, whose current or latest images are typically requestable from Web sites) or any type of still camera or audio-video device having components similar to those shown in FIGS. 4A and 4B. FIGS. 5 and 6, illustrate specific embodiments of cameras, with retractable lens barrels, having flexible circuits configured such that their fatigue lives are enhanced.

FIG. 5 is a diagrammatic illustration of a webcam showing details of one of the present embodiments. FIG. 5 shows a portion of a camera main body 502, a lens barrel 504, which can be moved into, and out of, main body 502, and a flexible circuit 508, which has a first end 510 connected to a printed circuit board 536 in main body 502 and a second end 512 that is connected to circuitry in lens barrel 504. Since FIG. 5 is essentially a rear upside down view of webcam 500, lens 506 is hidden. Movement of lens barrel 504 into, and out of, main body 502 is carried out with the help of a barrel positioning mechanism that is a combination of latching elements 516 and 518 and spring 520. Of course, any other suitable type of barrel positioning mechanism can be used. In the embodiment of FIG. 5, to prevent cracks from developing in flexible circuit 508 due to repeated movement of lens barrel 504 into, and out of, main body 502, posts such as 522 and 524 that enforce a bending shape of flexible circuit 508 are employed. In the embodiment of FIG. 5, flexible circuit 508 is lightly pressed (to form line contacts) against first post 522 and second post 524 with the help of hooks (first hook 526 positioned substantially at a top end 523 of first post 522 and second hook 528 positioned substantially at a bottom end 525 of second post 524). Of course, differently configured hooks, a different number of hooks, or any other suitable mechanism for holding flexible circuit 508 against the posts can be used. In should be noted that posts 522 and 524 are pre positioned where bends in flexible circuit 508 should occur and are generally perpendicular to an axis of movement 530 of barrel 504 (in general, the posts are substantially perpendicular to an axis of movement of moveable components such as 102 and 104 of FIG. 1). Each post 522, 524 may be a coil spring, a rubber or plastic cylinder, or may be made of any other suitable material. In FIG. 5, element 532 is an attachment feature for attaching webcam 500 to a computer monitor and element 534 is a cable through which webcam 500 can communicate with a computer.

FIG. 6 is a diagrammatic illustration of a webcam 600, which is substantially similar to webcam 500 of FIG. 5. However, instead of employing posts 522 and 524 to enforce a particular shape of flexible circuit 508, circuit 508 is configured as a helical spring 602. Helical spring 602 expands and collapses, in a manner described above in connection with FIGS. 2A and 2B, when barrel 504 is moved out of, and into, main body 502. One method embodiment for forming a helical spring (such as 602) from a flexible circuit is described below in connection with FIG. 7.

Figure 7:
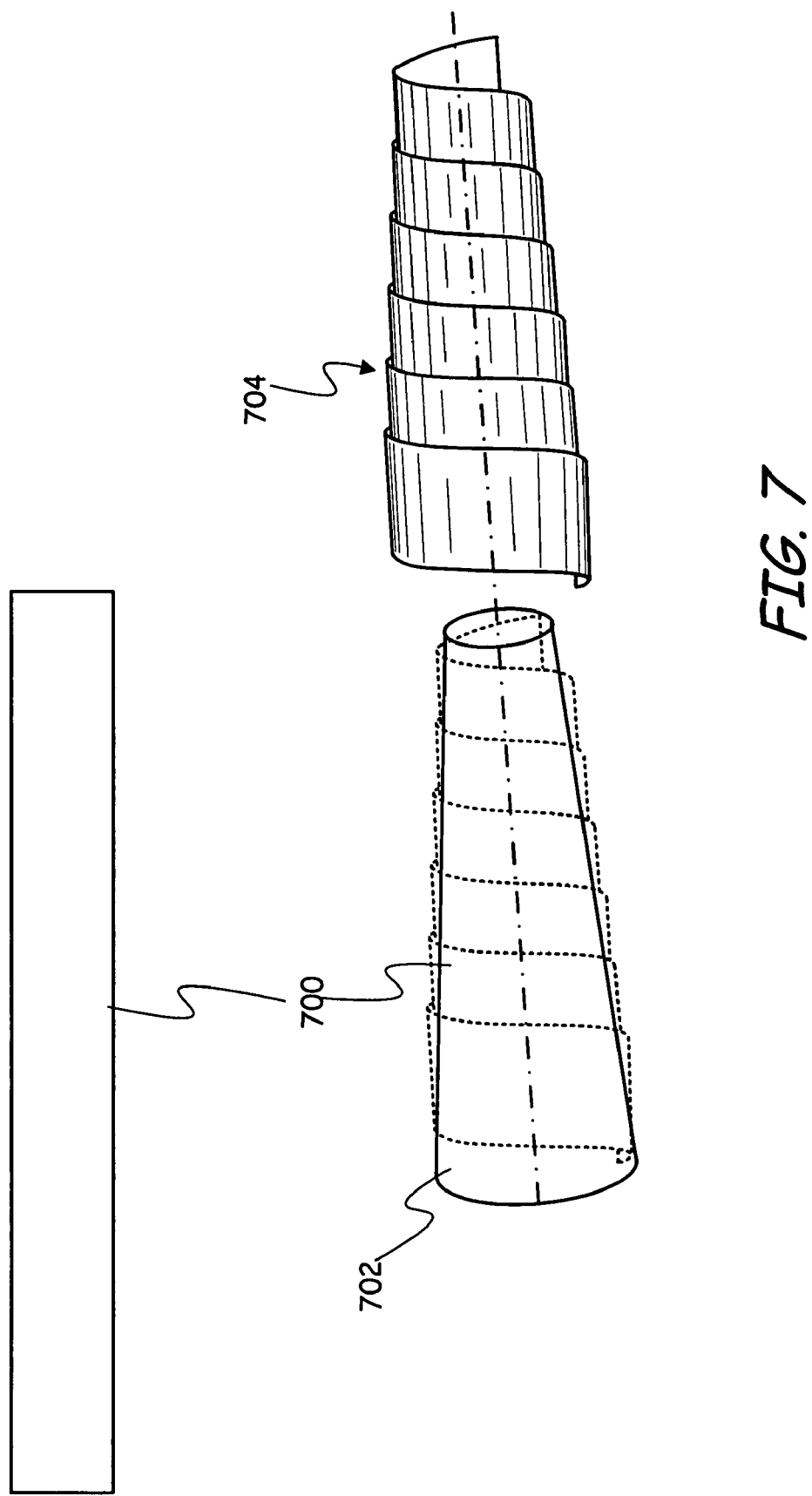
FIG. 7 is a simplified block diagram that illustrates the formation of a helical spring flexible circuit.

FIG. 7 is a diagrammatic illustration of an exemplary method of forming a helical spring from a flexible circuit. As can be seen in FIG. 7, the manufacturing of a substantially flat flexible circuit 700 to a helical coil spring design is facilitated by rolling the substantially flat flexible circuit 700 on a mandrel with a tapered design geometry (conical mandrel 702) that holds the shape of the spring. The finished helical spring is denoted be reference numeral 704. It should be noted that a flexible circuit can include about 80% of copper, which allows the flexible circuit to take the desired geometry and plastic deformation of copper helps maintain the shape of the helical spring. The pitch and number of coils of the spring can be manipulated to meet product design constraints.

A sinusoidal flexible circuit, shown in FIGS. 3A and 3B and described above, can be formed by suitably bending portions of a substantially flat flexible circuit (such as 700) around a cylindrical post (not shown) having a suitable radius.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a first component;
   a second component;
   a positioning mechanism, between the first component and the second component, that enables movement of the first component and the second component between at least a proximate position and a spaced-apart position; and
   a flexible circuit, between the first component and the second component, having a first end coupled to the first component and a second end coupled to the second component,
   wherein the flexible circuit is configured as a compliant spring that extends and collapses in a predefined shape, and
   wherein the predefined shape is a sinusoid having at least one crest and at least one trough, and
   wherein the at least one crest and at least one trough are configured to fit around at least one post, and
   wherein the at least one post is a coil spring.

2. The apparatus of claim 1 wherein the apparatus is a photographic device, and wherein the first component is a main body of the photographic device and the second component is a lens barrel, and wherein the positioning mechanism is a barrel-positioning mechanism, and wherein the proximate position is a retracted position, in which the lens barrel is within the main body, and the spaced-apart position is an extended position, in which the lens barrel projects out of the main body.

3. The apparatus of claim 1 wherein the at least one crest and the at least one trough are configured to fit around the at least one post while bending the flexible circuit into the predefined shape during manufacture.

4. The apparatus of claim 1 wherein the at least one crest and the at least one trough are configured to fit around the at least one post, which is a part of the apparatus.

5. The apparatus of claim 1 wherein the at least one post comprises a first post and a second post.

6. The apparatus of claim 5 wherein the first post includes a first hook and the second post includes a second hook, and wherein the first hook and the second hook are configured to hold the flexible circuit against the posts and thereby create line contacts between the flexible circuit and the posts.

7. The apparatus of claim 6 wherein the first hook is positioned substantially at a top end of the first post and the second hook is positioned substantially at a bottom end of the second post.

8. A webcam comprising:
a main body;
an attachment feature for attaching the webcam to a computer monitor;
a lens barrel; and
a barrel-positioning mechanism, operably coupled to the lens barrel and the main body, configured to move the lens barrel between a retracted position, in which the lens barrel is within the main body, and an extended position, in which the lens barrel projects out of the main body; and
a flexible circuit between the main body and the lens barrel,
wherein the flexible circuit is configured as a compliant spring that extends and collapses in a predefined shape, and
wherein the predefined shape is a sinusoid having at least one crest and at least one trough, and
wherein the at least one crest and the at least one trough are configured to fit around at least one post, and
wherein the at least one post is a coil spring.

9. The apparatus of claim 8 wherein the at least one post comprises a first post that is positioned proximate to the main body and a second post that is positioned proximate to the lens barrel.

10. The apparatus of claim 9 wherein the first post includes a first hook and the second post includes a second hook, and wherein the first hook and the second hook are configured to hold the flexible circuit against the posts and thereby create line contacts between the flexible circuit and the posts.

11. The apparatus of claim 10 wherein the first hook is positioned substantially at a top end of the first post and the second hook is positioned substantially at a bottom end of the second post.

12. An apparatus comprising:
a first component;
a second component;
a positioning mechanism, between the first component and the second component, that enables movement of the first component and the second component between at least a proximate position and a spaced-apart position; and
a flexible circuit, between the first component and the second component, having a first end coupled to the first component and a second end coupled to the second component,
wherein the flexible circuit is configured as a compliant spring that extends and collapses in a predefined shape, and
wherein the predefined shape is a sinusoid having at least one crest and at least one trough, and
wherein the at least one crest and the at least one trough are configured to fit around at least one post, and
wherein the at least one post comprises a first post and a second post, and
wherein the first post includes a first hook and the second post includes a second hook, and wherein the first hook and the second hook are configured to hold the flexible circuit against the posts and thereby create line contacts between the flexible circuit and the posts.

13. The apparatus of claim 12 wherein the first hook is positioned substantially at a top end of the first post and the second hook is positioned substantially at a bottom end of the second post.

* * * * *